United States Patent
Inoue et al.

(10) Patent No.: US 9,906,967 B2
(45) Date of Patent: Feb. 27, 2018

(54) WORK MACHINE AND COMMUNICATION MONITORING METHOD

(71) Applicant: Kubota Corporation, Osaka-shi (JP)

(72) Inventors: Hirotsugu Inoue, Sakai (JP); Kazuhiro Takahara, Sakai (JP); Hiroshi Ikeda, Sakai (JP); Kazunori Matsufuji, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 14/785,974

(22) PCT Filed: Feb. 20, 2014

(86) PCT No.: PCT/JP2014/054024
§ 371 (c)(1),
(2) Date: Oct. 21, 2015

(87) PCT Pub. No.: WO2014/178215
PCT Pub. Date: Nov. 6, 2014

(65) Prior Publication Data
US 2016/0073275 A1     Mar. 10, 2016

(30) Foreign Application Priority Data

Apr. 30, 2013   (JP) .................................. 2013-095310

(51) Int. Cl.
*H04B 5/00* (2006.01)
*H04W 24/04* (2009.01)
(Continued)

(52) U.S. Cl.
CPC .......... *H04W 24/04* (2013.01); *A01D 41/127* (2013.01); *E02F 9/2054* (2013.01); *E02F 9/264* (2013.01);
(Continued)

(58) Field of Classification Search
CPC ..... H04W 4/008; H04W 84/005; G06Q 10/08
See application file for complete search history.

(56) References Cited

U.S. PATENT DOCUMENTS 7,643,938 B2 *   1/2010   Adachi .................. B60R 25/00
                                                                340/426.1
2001/0044588 A1 *  11/2001   Mault .................. A61B 5/0002
                                                                600/549
(Continued)

FOREIGN PATENT DOCUMENTS

CN          1723475 A      1/2006
CN          102165880 A    8/2011
(Continued)

OTHER PUBLICATIONS

Kei Ogasaware, Report (Fujitsu to NEC ga Nogyo Cloud o Aitsugi Kaishi Ryutsu ya Gaishoku o Kokyaku ni Shin Business Soshutsu), Nikkei Computer, Aug. 2, 2012, p. 15. No. 814 (cited in ISR and WO for PCT/JP2014/054024).

*Primary Examiner* — Cindy Trandai
(74) *Attorney, Agent, or Firm* — The Webb Law Firm

(57) ABSTRACT

Disclosed are a work machine and a communication monitoring method that allow recording of work information even in the event of interruption of communication in a communication path between the work machine, a mobile communication terminal and a server. There is provided a control section (71) configured to transmit work information to a server (Z) via a communication section (68) and a smartphone (Y) if a monitoring section (69) detects that communication is possible between the communication section (68) and the smartphone (Y) and also to cause a storage section (70) to store the work information if the monitoring section (69) detects that communication is not possible between the communication section (68) and the smartphone (Y).

10 Claims, 13 Drawing Sheets

(51) Int. Cl.

| | | |
|---|---|---|
| *H04M 11/00* | (2006.01) | |
| *A01D 41/127* | (2006.01) | |
| *G07C 5/00* | (2006.01) | |
| *H04W 4/00* | (2018.01) | |
| *E02F 9/20* | (2006.01) | |
| *G06Q 10/08* | (2012.01) | |
| *E02F 9/26* | (2006.01) | |
| *A01D 34/00* | (2006.01) | |

(52) U.S. Cl.
CPC ............ *G06Q 10/08* (2013.01); *G07C 5/008* (2013.01); *H04M 11/00* (2013.01); *H04W 4/006* (2013.01); *A01D 34/008* (2013.01)

(56) References Cited

U.S. PATENT DOCUMENTS

| | | | |
|---|---|---|---|
| 2002/0059320 A1 | 5/2002 | Tamaru | |
| 2003/0054808 A1 | 3/2003 | Watanabe et al. | |
| 2003/0098798 A1 | 5/2003 | Kato | |
| 2006/0109109 A1* | 5/2006 | Rajapakse | G01S 5/0027 |
| | | | 340/539.13 |
| 2006/0114336 A1* | 6/2006 | Liu | H04N 9/8205 |
| | | | 348/231.3 |
| 2006/0200560 A1* | 9/2006 | Waugh | G06Q 10/08 |
| | | | 709/224 |
| 2008/0015955 A1 | 1/2008 | Ehrman et al. | |
| 2008/0154691 A1* | 6/2008 | Wellman | G05D 1/0282 |
| | | | 705/7.26 |
| 2010/0077451 A1 | 3/2010 | Fujimoto et al. | |
| 2012/0225632 A1 | 9/2012 | Hellwig et al. | |
| 2012/0256760 A1 | 10/2012 | Johnson et al. | |
| 2013/0096799 A1 | 4/2013 | Horne | |
| 2013/0167227 A1 | 6/2013 | Miura et al. | |
| 2014/0200760 A1 | 7/2014 | Kaufmann et al. | |
| 2014/0274225 A1* | 9/2014 | Lacatus | H04W 24/08 |
| | | | 455/574 |
| 2015/0039269 A1* | 2/2015 | Mejegard | G06Q 10/06 |
| | | | 702/182 |

FOREIGN PATENT DOCUMENTS

| | | |
|---|---|---|
| JP | 11190048 A | 7/1999 |
| JP | 2000222691 A | 8/2000 |
| JP | 2002188183 A | 7/2002 |
| JP | 2002271833 A | 9/2002 |
| JP | 2003204199 A | 7/2003 |
| JP | 2004133509 A | 4/2004 |
| JP | 2010072985 A | 4/2010 |
| JP | 4694689 B2 | 6/2011 |
| JP | 2013066424 A | 4/2013 |
| JP | 2013067997 A | 4/2013 |
| JP | 2013069124 A | 4/2013 |
| WO | 2012163862 A1 | 12/2012 |

\* cited by examiner

Fig.15

| process | situation | | information to be stored | storage destination |
|---|---|---|---|---|
| A | [combine] – [smartphone]<br>[smartphone] – [server]<br>GPS location information | ○<br>○<br>○ | [field ID, GPS location information, work information] | server |
| B | [combine] – [smartphone]<br>[smartphone] – [server]<br>GPS location information | ×<br>○(×)<br>○(×) | [provisional field block, time information, work information] | combine |
| C | [combine] – [smartphone]<br>[smartphone] – [server]<br>GPS location information | ○<br>○<br>× | [field ID, time information, work information] | server |
| D | [combine] – [smartphone]<br>[smartphone] – [server]<br>GPS location information | ○<br>×<br>○ | [provisional field block, GPS location information, work information] | combine or smartphone |
| E | [combine] – [smartphone]<br>[smartphone] – [server]<br>GPS location information | ○<br>×<br>× | [provisional field block, time information, work information] | combine or smartphone |

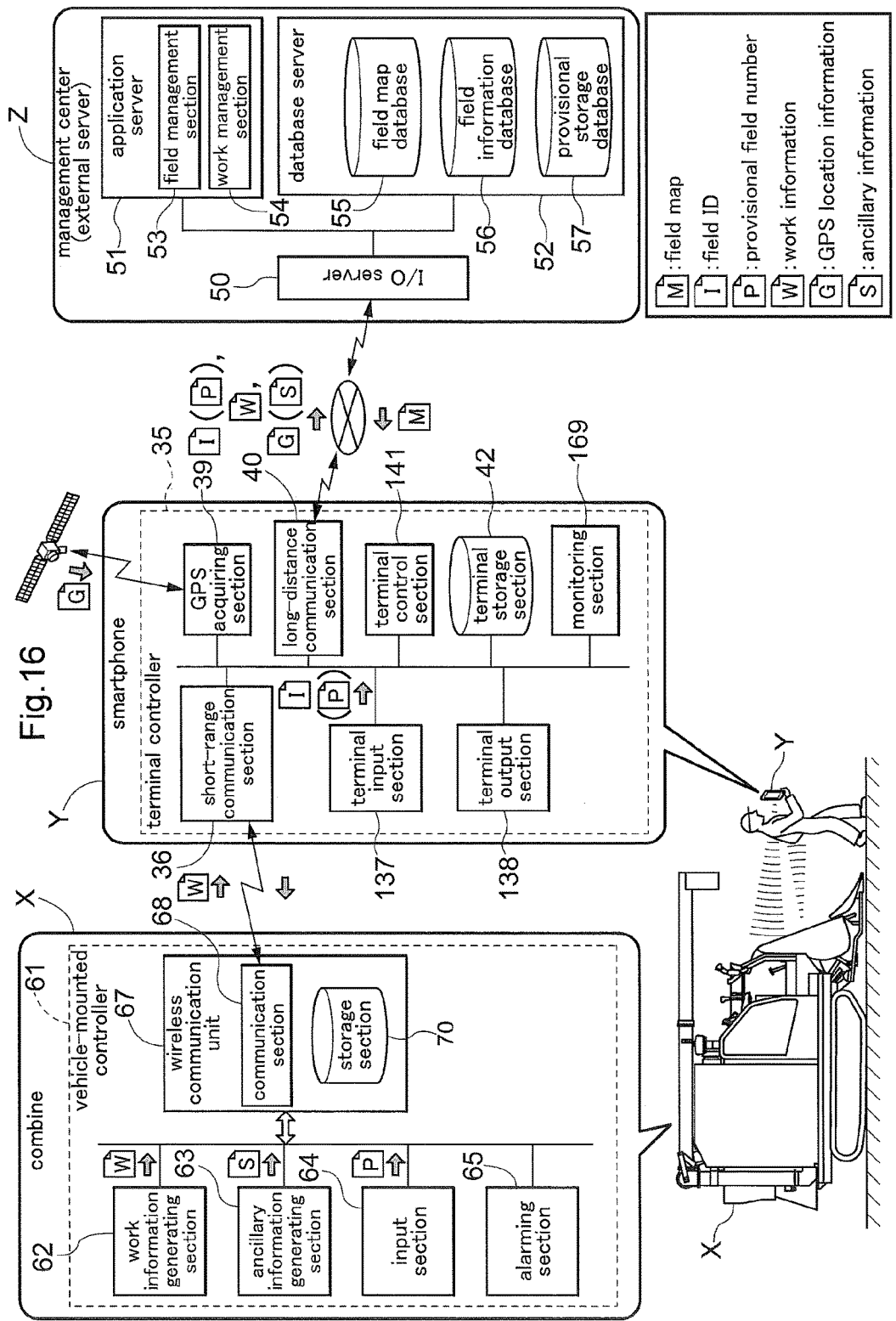

US 9,906,967 B2

WORK MACHINE AND COMMUNICATION MONITORING METHOD

CROSS-REFERENCE TO RELATED APPLICATIONS

This application is the United States national phase of International Application No. PCT/JP2014/054024 filed Feb. 20, 2014, and claims priority to Japanese Patent Application No. 2013-095310 filed Apr. 30, 2013, the disclosures of which are hereby incorporated in their entirety by reference.

TECHNICAL FIELD

The present disclosure relates to a work machine having a communication section capable of communication with an external server via a mobile communication terminal and relates also to a communication monitoring method for monitoring communication between a work machine that effects a ground work, an external server and a mobile communication terminal.

BACKGROUND ART

A conventional work machine is disclosed in e.g. Patent Document 1. The work machine disclosed in Patent Document 1 is configured such that work information of work executed by a work section is transmitted from the work machine via a mobile communication terminal ("mobile communication terminal" in Patent Document 1) to an external server of a management center or the like. With such configuration, it is possible for the work machine and the server to share work information of the work machine and to implement management or the like of the work machine by the external server.

BACKGROUND ART DOCUMENT

Patent Document

Patent Document 1: Japanese Patent No. 4694689 (JP4694689B2).

SUMMARY

Problem to be Solved by Invention

However, with the above-described conventional technique, since work information is transmitted in a sequential manner from the work machine to the server via the mobile communication terminal, if communication is interrupted in a communication path between the work machine, the mobile communication terminal and the server, there is the possibility of recording of the work information not being effected.

In view of the above-described state of the art, there is a need for a work machine and a communication monitoring method that allow recording of work information even in the event of interruption of communication in a communication path between the work machine, a mobile communication terminal and a server.

Solution

A work machine according to the present invention comprises:

a work section for effecting a ground work;
a communication section capable of communication with an external server via a mobile communication terminal;
a monitoring section for monitoring communication condition between the communication section and the mobile communication terminal;
a storage section capable of storing information of work effected by the work section; and
a control section configured to transmit the work information to the server via the communication section and the mobile communication terminal if the monitoring section detects that communication is possible between the communication section and the mobile communication terminal and also to cause the storage section to store the work information if the monitoring section detects that no communication is possible between the communication section and the mobile communication terminal.

According to the present invention, communication condition between the communication section of the work machine and the mobile communication terminal is monitored by the monitoring section. If the monitoring section detects that the communication between the communication section of the work machine and the mobile communication terminal is possible, work information relating to work effected by the work section is transmitted to the server via the communication section and the mobile communication terminal to be stored on the server side. Whereas, if the monitoring section detects that the communication between the communication section of the work machine and the mobile communication terminal is not possible, the work information relating to work effected by the work section is stored in the storage section of the work machine. Therefore, for instance, in the case of failure of the mobile communication terminal or in case the driver forgets to carry the mobile communication terminal, work information is stored in the storage section of the work machine, so that the work information stored in the storage section can be moved to the server later. Consequently, even when communication breakdown occurs between the communication section of the work machine and the mobile communication terminal thereby to interrupt communication in the communication path between the work machine, the mobile communication terminal and the server, recording of the work information is still possible.

A work machine according to the present invention comprises:

a work section for effecting a ground work;
a communication section capable of communication with an external server via a mobile communication terminal;
a monitoring section for monitoring communication condition between the mobile communication terminal and the server;
a storage section capable of storing information of work effected by the work section; and
a control section configured to transmit the work information to the server via the communication section and the mobile communication terminal if the monitoring section detects that communication is possible between the mobile communication terminal and the server and also to cause the storage section or a terminal storage section of the mobile communication terminal to store the work information if the monitoring section detects that no communication is possible between the mobile communication terminal and the server.

According to the present invention, communication condition between the mobile communication terminal and the external server is monitored by the monitoring section. If the monitoring section detects that the communication between the mobile communication terminal and the external server is possible, work information relating to work effected by the work section is transmitted to the server via the communication section and the mobile communication terminal to be stored on the server side. Whereas, if the monitoring section detects that the communication between the mobile communication terminal and the external server is not possible, the work information relating to work effected by the work section is stored in either the storage section of the work machine or a storage section of the mobile communication terminal. Therefore, for instance, even if communication problem occurs between the mobile communication terminal and the external server or in the case of failure or malfunction of the external server, work information is stored in the storage section of the work machine or the terminal storage section of the mobile communication terminal, so that the work information stored in the storage section or the terminal storage section can be moved to the server later. Consequently, even when communication breakdown occurs between the mobile communication terminal and the external server thereby to interrupt communication in the communication path between the work machine, the mobile communication terminal and the server, recording of the work information is still possible.

In the above-described configuration, preferably, there is provided an alarming section to effect alarming to a driver if the monitoring section detects that the communication is not possible.

With the above-described configuration, if the monitoring section detects that the communication is not possible among the work machine, the mobile communication terminal and the server, the alarming section alarms the driver that the communication is currently not possible. With this, it is possible to cause the driver to recognize occurrence of communication interruption speedily.

In the above-described configuration, preferably, the control section links time information at time point of detection of communication impossibility by the monitoring section with the work information.

With the above-described configuration, if the monitoring section detects that communication is not possible between the work machine and the mobile communication terminal for instance, time information at time point of this detection of communication impossibility is linked with the work information. With this, it becomes possible to identify the time (times of day) when the work information was obtained, so that estimation of detailed location to which the work information corresponds is made easy.

In the above-described configuration, preferably, there is provided an input section capable of inputting location information of a location where the ground work was carried out when the monitoring section detects the communication is not possible; and the control section links the location information inputted by the input section with the work information.

With the above-described configuration, when the monitoring section detects the communication is not possible, the input section inputs location information of a location where the ground work was carried out, so that this inputted location information can be linked with the work information. With this, based on the inputted location information, the location to which the work information corresponds can be estimated approximately.

In the above-described configuration, preferably, the control section transmits the stored work information to the server via the mobile communication terminal if the monitoring section detects the communication has become possible again after the monitoring section detected communication impossibility.

With the above-described configuration, if the monitoring section detects that the communication is not possible and then the communication is possible, the work information stored when the communication was not possible is now transmitted to the server. Therefore, even if a situation of communication impossibility occurs among the work machine, the mobile communication terminal and the server, the work information at the time of communication impossibility can be obtained by the server speedily as soon as the communication is restored.

In the above-described configuration, preferably, the control section links GPS location information acquired by the mobile communication terminal with the work information if the monitoring section detects the communication is not possible.

With the above-described configuration, the work information is linked with GPS location information. Then, based on this GPS location information, it is possible to specify a detailed location such as a segment in a field to which location the work information corresponds. Therefore, if the work information linked with the GPS location information is recorded for instance, with reference to this stored (recorded) work information linked with the GPS location information, it becomes possible later to specify a detailed location such as a segment in a field to which location the work information corresponds, with reference to the stored work information linked with the GPS location information.

A communication monitoring method for monitoring communication among a work machine that effects a ground work, an external server and a mobile communication terminal, according to the present invention, comprises:

a monitoring step for monitoring communication condition between the mobile communication terminal and the server;

a transmitting-receiving step for receiving, from a communication section of the work machine, work information of a work effected by a work section of the work machine and transmitting the work information to the server if it is detected at the monitoring step that communication is possible between the mobile communication terminal and the server; and a storing step for causing a storage section of the work machine or a terminal storage section of the mobile communication terminal to store the work information if it is detected at the monitoring step that communication is not possible between the mobile communication terminal and the server.

According to the present invention, communication condition between the mobile communication terminal and the server is monitored by the mobile communication terminal. If the communication between the mobile communication terminal and the server is possible, the work information of a work effected by a work section of the work machine is received from the communication section of the work machine and transmitted to the server. On the other hand, if it is detected that the communication between the mobile communication terminal and the server is not possible, the work information is stored in either the storage section of the work machine or the terminal storage section of the mobile communication terminal. Therefore, even when communication breakdown occurs between the mobile communication terminal and the external server thereby to interrupt communication in the communication path between the work machine, the mobile communication terminal and the server, recording of the work information is still possible.

In the above-described configuration, preferably, there is provided an alarming step to effect alarming to a driver if it is detected at the monitoring step that the communication is not possible.

With the above-described configuration, if the communication between the mobile communication terminal and the external server is disabled, alarming is given to the driver to the effect that the communication has been disabled. With this, it is possible to cause the driver to recognize occurrence of communication interruption speedily.

In the above-described configuration, preferably, the method further comprises a time linking step for linking time information at time point of detection of communication impossibility at the monitoring step with the work information.

With the above-described configuration, if it is detected that communication is not possible between the work machine and the mobile communication terminal for instance, time information at time point of this detection of communication impossibility is linked with the work information. With this, it becomes possible to identify the time (times of day) when the work information was obtained, so that estimation of detailed location to which the work information corresponds is made easy.

In the above-described configuration, preferably, the method further comprises:

an input step for inputting location information of a location where the ground work was carried out when it is detected at the monitoring step that the communication is not possible; and a location linking step for linking the location information inputted at the inputting step with the work information.

With the above-described configuration, when it is detected at the monitoring step that the communication is not possible, location information of a location where the ground work was carried out is inputted, so that this inputted location information can be linked with the work information. With this, based on the inputted location information, the location to which the work information corresponds can be estimated approximately.

In the above-described configuration, preferably, the method further comprises a follow-up transmitting step for transmitting the stored work information to the server via the mobile communication terminal if it is detected at the monitoring step that the communication has become possible again after communication impossibility is detected.

With the above-described configuration, if it is detected that the communication is not possible between the mobile communication terminal and the server and then the communication is possible between the mobile communication terminal and the server, the work information stored when the communication was not possible is now transmitted to the server. Therefore, even if a situation of communication impossibility occurs among the work machine, the mobile communication terminal and the server, the work information at the time of communication impossibility can be obtained by the server speedily as soon as the communication is restored.

In the above-described configuration, preferably, the method further comprises a GPS linking step for linking GPS location information acquired by the mobile communication terminal with the work information if it is detected at the monitoring step that the communication is not possible.

With the above-described configuration, the work information is linked with GPS location information. Then, based on this GPS location information, it is possible to specify a detailed location such as a segment in a field to which position the work information corresponds. Therefore, if the work information linked with the GPS location information is recorded for instance, with reference later to this stored (recorded) work information linked with the GPS location information, it is possible to specify a detailed location such as a segment in a field to which location the work information corresponds.

BRIEF DESCRIPTION OF THE DRAWINGS

FIG. 15 is a table showing storage destinations of data according to communication situations, FIG. 16 is an explanatory view showing a system configuration in a second embodiment of the present invention.

EMBODIMENTS

Next, embodiments of the present invention will be explained.

First Embodiment

Firstly, a first embodiment of the present invention will be explained with reference to the accompanying drawings. In the first embodiment of the present invention, communication is effected between a combine X (an example of a "work machine") and a smartphone Y (an example of a "mobile communication terminal") and communication is effected also between the smartphone Y and a server Z. In the course of these, the combine X monitors the communication between this combine X and the smartphone Y, the communication between the smartphone Y and the server Z, etc.

[Machine Configuration of Combine]

Figure 1:
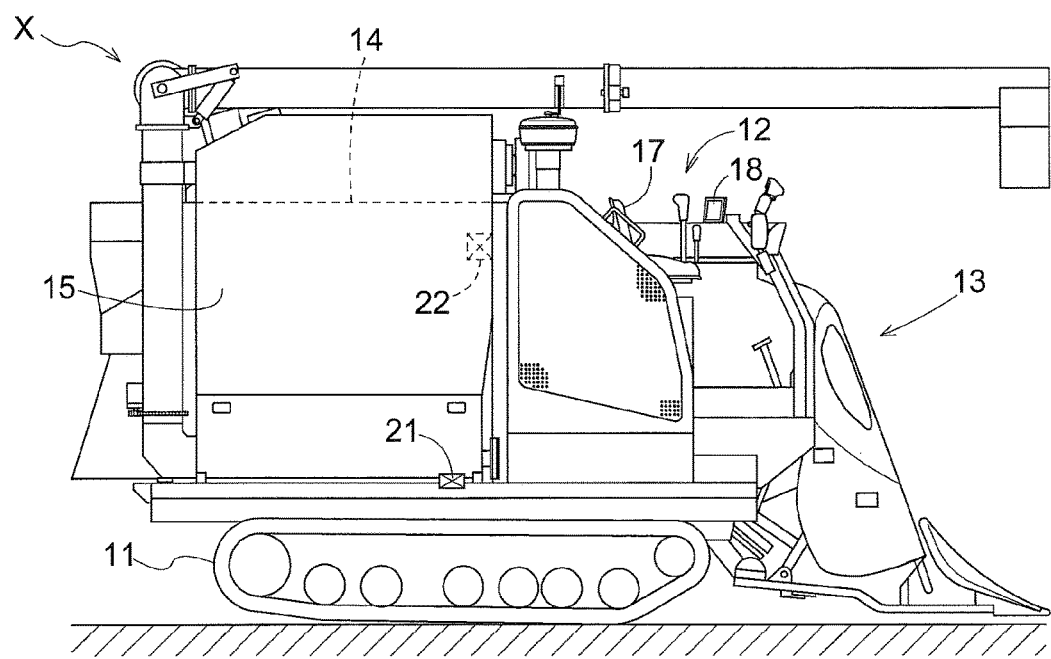
FIG. 1 is a side view of a combine as an example of a work machine.

As shown in FIG. 1, the combine X is configured as a crawler-traveling and self-threshing type and includes a crawler traveling device 11 driven by an engine as its traveling mechanism. Upwardly of the crawler traveling device 11, there is provided a driving section 12 in which a driver can ride. As a "work section" for effecting a ground work, there are provided a reaping section 13 provided at a front portion of a traveling machine body and effecting a reaping work of planted grain stalks in a farming field as a location for effecting the work, a threshing device 14 for threshing grains from the reaped stalks reaped by the reaping section 13, and so on. Further, laterally of the threshing device 14, there is provided a grain tank 15 for accumulating and storing grains threshed by the threshing device 14.

In the driving section 12, there are disposed an input device 16 for effecting input operations by the driver, a vehicle-mounted display 18 disposed at a position readily viewed by the driver seated at a driver's seat 17, and a vehicle-mounted speaker 19 (see FIG. 3) capable of outputting sound. In the driving section 12, there are also disposed control levers, control pedals, control switches, etc. which are to be operated by the driver.

The threshing device 14 is configured such that threshing operation of grains from reaped stalks is effected when a threshing clutch 20 is engaged and the operation is stopped when the threshing clutch 20 is disengaged.

Downwardly of the grain tank 15, there is provided a yield sensor 21 as a weight sensor for detecting weight of grains accumulated in the grain tank 15. The yield sensor 21 outputs "yield data" of grains accumulated and stored inside the grain tank 15. Inside the grain tank 15, there is provided a taste sensor 22 as a quality sensor for detecting quality such as a moisture value, a protein value, etc. of the grains accumulated inside the grain tank 15. The taste sensor 22 outputs "taste data" of grains accumulated and stored inside the grain tank 15. When a discharge clutch 23 is engaged, grains accumulated inside the grain tank 15 are discharged to the outside of the machine. When the discharge clutch 23 is disengaged, discharge of grains accumulated inside the grain tank 15 is stopped. The combine X further includes a rotation sensor 24 for detecting an engine rotation speed, a vehicle speed sensor 25 for detecting vehicle speed, an hour meter 26 for calculating added-up engine operation time, etc. As described above, the combine X includes various detection sensors such as the yield sensor 21, the taste sensor 22, a sensor for detecting engagement and disengagement of the threshing clutch 20, a sensor for detecting engagement and disengagement of the discharge clutch 23, the rotation sensor 24, the vehicle speed sensor 25, the hour meter 26, and so on.

The combine X configured as described above, as shown in FIG. 2, effects a short-range communication with the smartphone Y and this smartphone Y effects a long-range communication with an external server installed at a management center for instance. With this, the combine X can transmit "work information" to the external server Z. Before the control configuration of the combine X is explained, configurations of the smartphone Y and the server Z will be explained.

[Smartphone]

Figure 2:
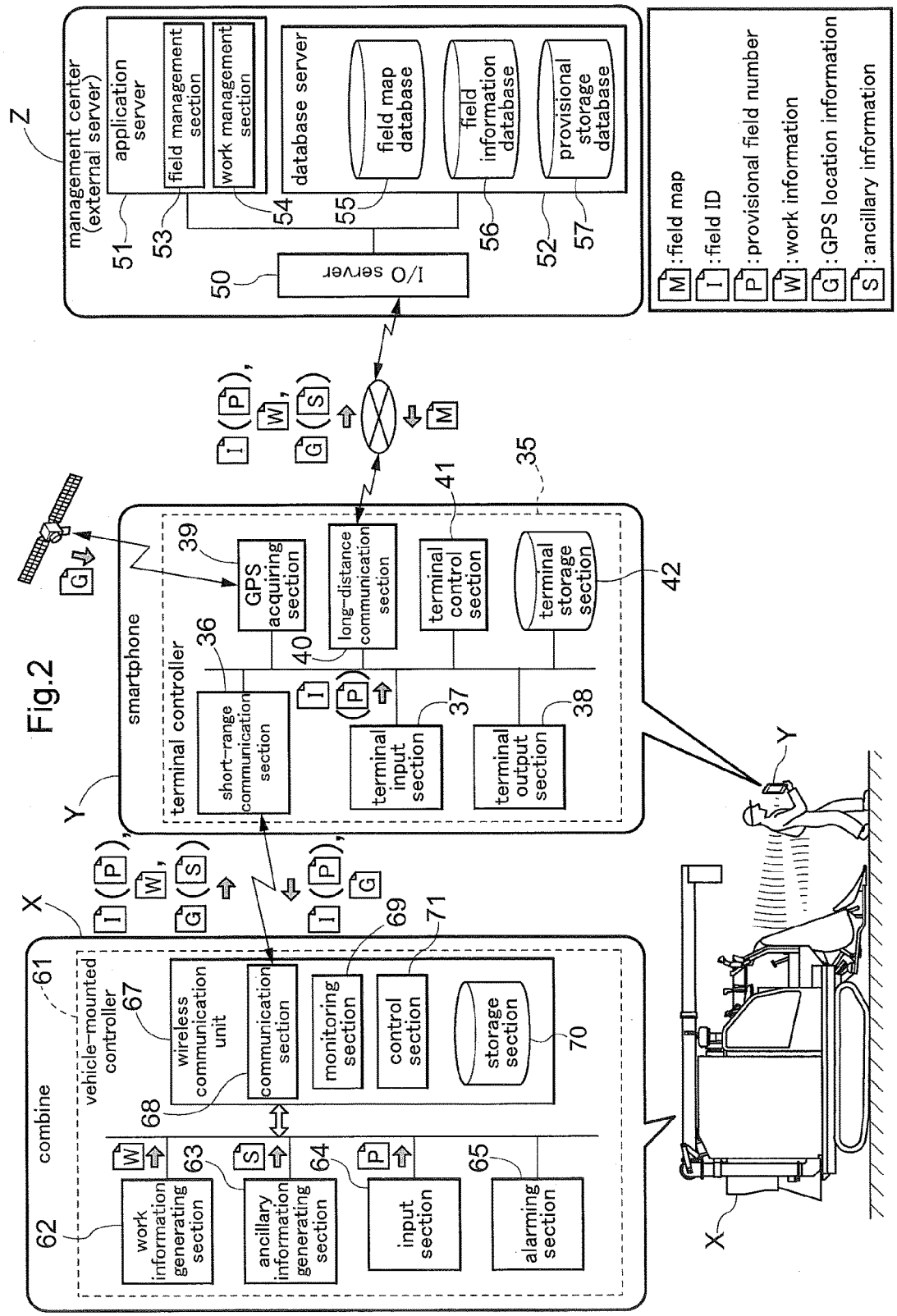
FIG. 2 is an explanatory view showing a system configuration.
Figure 4:
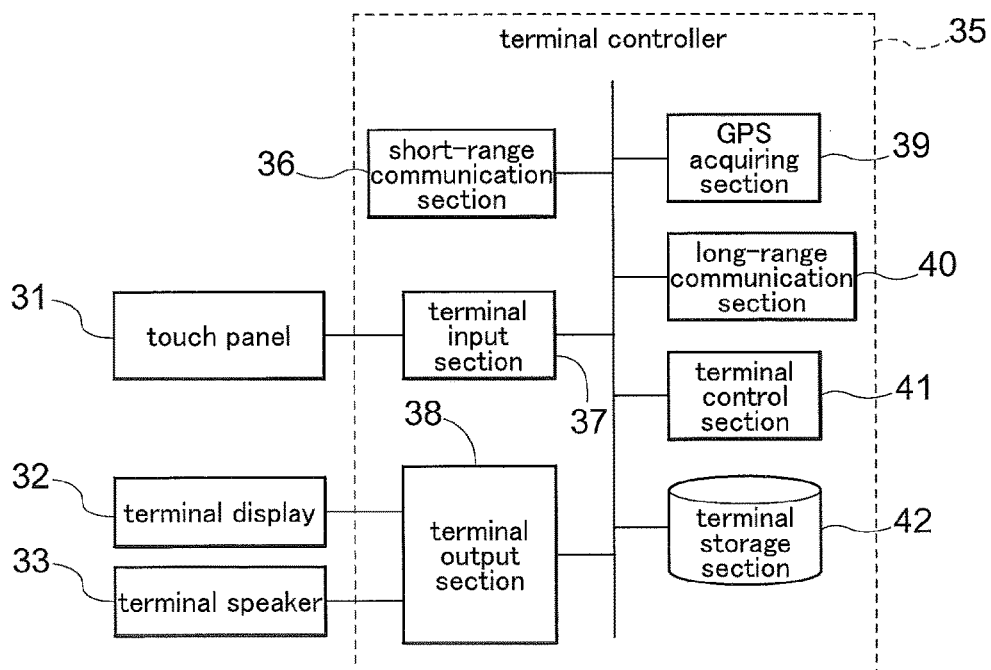
FIG. 4 is an explanatory view showing a system configuration.

The smartphone Y is located in close vicinity of the combine X as being worn on a driver's body or set in an unillustrated cradle provided in vicinity of the driver's seat 17. The smartphone Y includes, as I/O (input/output) devices, a touch panel 31 which receives inputs of operations by the driver, a terminal display 32 for displaying various kinds of information, and a terminal speaker 33 capable of sound output. Further, the smartphone Y includes also a terminal controller 35 in which various processing functions are configured of software and/or hardware. As shown in FIG. 2 and FIG. 4, the terminal controller 35 includes a short-range communication section 36, a terminal input section 37, a terminal output section 38, a GPS acquiring section 39, a long-range communication section 40, a terminal control section 41, and a terminal storage section 42.

The short-range communication section 36 effects short-range communication with the combine X. The terminal input section 37 outputs contents of operation input from the touch panel 31. The terminal output section 38 outputs various information in the form of display by the terminal display 32 or in the form of sounds from the terminal speaker 33. The GPS acquiring section 39 acquires "GPS location information" from a GPS satellite and outputs this information. The long-range communication section 40 effects long-range communication with an external I/O server Z installed at a management center or the like which is located at a site relatively distant from a work site where a work is effected by the combine X via a mobile phone communication network or WAN such as the internet. The terminal control section 41 executes application programs installed in a computer incorporated within the smartphone Y to effect control of the entire terminal device. The terminal storage section 42 is configured to be capable of storing/recording various kinds of information.

[Server]

The server Z includes an I/O (input/output) server 50 for effecting communication with the outside, an application server 51, and a database server 52. The application server 51 includes a field management section 53, and a work management section 54. The database server 52 includes a field map database 55, a field information database 56 and a provisional storage database 57.

The field management section 53 manages field information in cooperation with the field information database 56 and the provisional storage database 57, the filed information being information relating to a field such as a field number, a field name, a field address, a field map position, a field shape, a field area, a field planting species, etc. The work management section 54 manages "work information" in cooperation with the database server 52 and the provisional storage database 57, the work information being transmitted from the smartphone Y.

The field map database 55 stores therein "a field map" including "a field ID" such as a name, a number or the like that can uniquely identify a field and "a field map" linked with e.g. an actual map position or the like. In operation, with using "a field ID" or "GPS location information" as a search condition, extraction of the "field map" for instance will be effected. The field information database 56 stores therein for each "field ID", an address of the field, an owner of the field, a planting species of the field, terrain information of the field, environment information of the field such as whether this field is a dry field or a wet field, other field information within a segment of the field, etc. The provisional storage database 57 can store provisionally or temporarily "work information" linked with "provisional field block" to be described later which is transmitted from the smartphone Y.

[Control Configuration of Combine]

Figure 3:
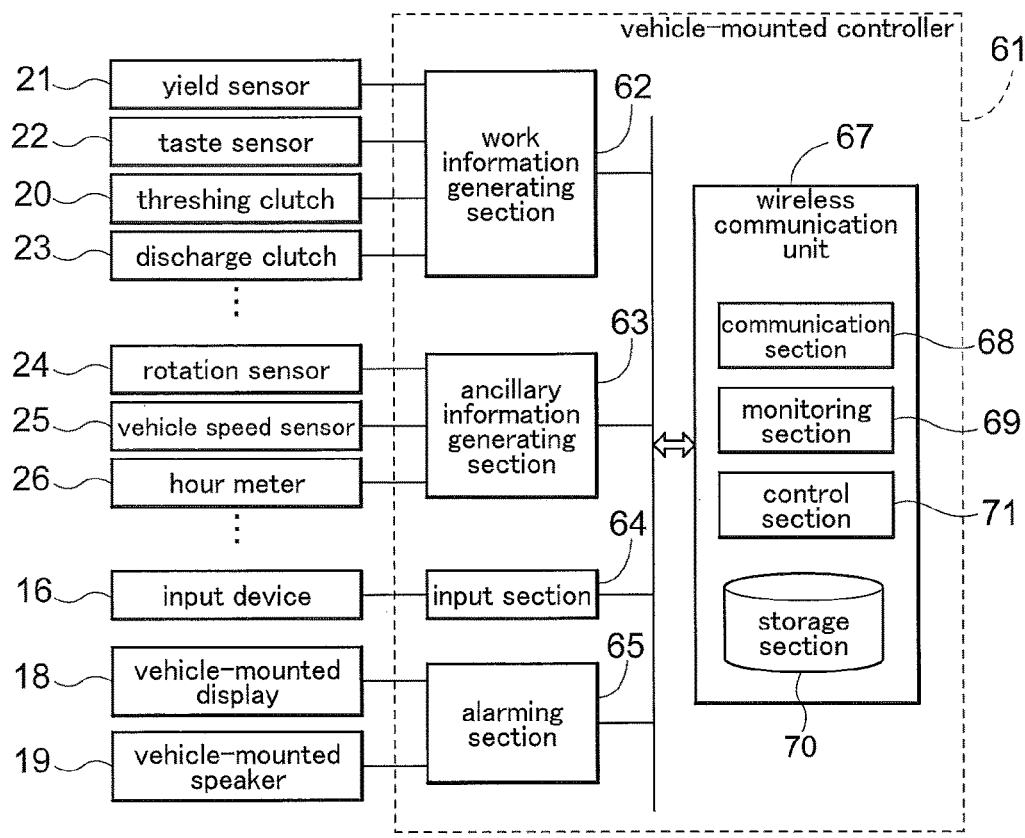
FIG. 3 is an explanatory view showing a system configuration.

As shown in FIGS. 2 and 3, the combine X mounts a vehicle-mounted controller 61 which comprises an ECU constituted of various processing functions in the form of software and/or hardware. The vehicle-mounted controller 61 includes, as control constituents thereof, a work information generating section 62, an ancillary information generating section 63, an input section 64, and an alarming section 65, with these various control constituents being interconnected via a data transmission line such as a vehicle-mounted LAN, etc. A wireless communication unit 67 includes a communication section 68, a monitoring section 69, a storage section 70 and a control section 71.

The work information generating section 62 outputs "work information" relating a work effected by the reaping section 13, the threshing device 14, etc. of the combine X. The work information generating section 62 is connected to detection devices relating to work such as the threshing clutch 20, the yield sensor 21, the taste sensor 22, the discharge clutch 23, etc. The "work information" includes e.g. "yield data" obtained by the yield sensor 21, the "taste data" such as a moisture value, a protein content value, etc. obtained by the taste sensor 22, information of engagement/disengagement of the discharge clutch 23, and so on.

The ancillary information generating section 63 outputs ancillary information other than the "work information". Inside this ancillary information generating section 63, there is provided a timer which outputs "time information". The ancillary information generating section 63 is connected to e.g. the rotation sensor 24, the vehicle speed sensor 25, the hour meter 26, etc. The "ancillary information" outputted by the ancillary information generating section 63 includes the "time information", an engine speed measured by the rotation sensor 24, a vehicle (machine) speed detected by the vehicle speed sensor 25, an added-up engine operation hours detected by the hour meter 26, etc.

To the input section 64, information operation inputted by the input device 16 is outputted. The input section 64 is connected to the input device 16. The input section 64 is configured to be capable of inputting by the input device 16 e.g. location information of a location where a ground operation was effected, when the monitoring section 69 detects communication impossibility. The location information above can be information which allows at least approximate estimation of a location of a field where a reaping work was effected.

The alarming section 65 effects alarming to the driver if the monitoring section 69 detects impossibility of communication between the smartphone Y and the server Z. In this, as examples of method of alarming, there are displaying alarming by the vehicle-mounted display 18, sound alarming by the vehicle-mounted speaker 19, displaying alarming by the terminal display 32 of the smartphone Y, and vibration alarming by an unillustrated vibrator of the smartphone Y. Further, the alarming section 65 effects alarming to the driver also if the monitoring section 69 detects impossibility of communication between the combine X and the smartphone Y. As examples of method of alarming in this case, there are displaying alarming by the vehicle-mounted display 18, sound alarming by the vehicle-mounted speaker 19, etc. The alarming section 65 effects alarming to the driver also if the monitoring section 69 detects that the "GPS location information" cannot be acquired. As examples of method of alarming in this case, there are displaying alarming by the vehicle-mounted display 18, sound alarming by the vehicle-mounted speaker 19, displaying alarming by the terminal display 32 of the smartphone Y, sound alarming by the terminal speaker 33 of the smartphone Y, vibration alarming by the unillustrated vibrator of the smartphone Y, and so on.

The wireless communication unit 67 is configured to be capable of wireless (radio) communication with an external device present nearby via a wireless LAN such as "Wi-Fi (registered trademark)" or "BlueTooth (registered trademark)", etc. The wireless communication unit 67 incorporates therein the communication section 68, the monitoring section 69, the storage section 70 and the control section 71. The communication section 68 effects short-range communication with mainly the short-range communication section 36 of the smartphone Y via the wireless LAN connection. The communication section 68 is configured to be capable of communication with the external server Z of e.g. the management center, via the smartphone Y, through its connection with this smartphone Y.

The monitoring section 69 is configured to monitor communication condition between the combine X and the smartphone Y. The monitoring section 69 constantly effects checking of communication to the terminal control section 41 of the smartphone Y. If a response from the smartphone Y is present, it is detected that communication is possible between the combine X and the smartphone Y. If no response from the smartphone Y is present, it is detected that communication between the combine X and the smartphone Y is not possible. Further, the monitoring section 69 is configured to monitor also communication condition between the smartphone Y and the server Z. The monitoring section 69 constantly monitors whether a connection signal indicative of connection from the smartphone Y to the server Z is being received from the smartphone Y or not. If such connection signal is being received, it is detected that communication is possible between the smartphone Y and the server Z. Whereas, if no such connection signal is being received, it is detected that communication is not possible between the smartphone Y and the server Z. In this way, the monitoring section 69 is configured to be capable of detecting whether communication between the combine X and the server Z via the smartphone Y is possible or not. Further, the monitoring section 69 also monitors whether the "GPS location information" is being received from the smartphone Y or not.

The storage section 70 is configured to be capable of storing various kinds of information therein and is used in particular for storing "work information" relating to a work effected by the "work section" such as the reaping section 13 or the threshing device 14 of the combine X.

The control section 71 links the "GPS location information" and the "field ID" acquired by the smartphone Y with the "work information". If the monitoring section 69 detects that communication between the communication section 68 of the combine X and the smartphone Y is possible and the monitoring section 69 detects also that communication between the smartphone Y and the server Z is possible, then, the control section 71 transmits the "work information" linked with the "field ID", "GPS location information" etc. to the server Z via the communication section 68 and the smartphone Y.

Further, if the monitoring section 69 detects that communication between the communication section 68 of the combine X and the smartphone Y is not possible, then, the control section 71 links the "ancillary information" including "time information" (hour information) with the "work information" and acquires via the input section 64 the location information inputted from the input device 16 of the combine X or inputs location information from the touch panel 31 of the smartphone Y and links this with the "work information". Then, if the monitoring section 69 detect that the communication between the communication section 68 of the combine X and the smartphone Y is not possible, then, the control section 71 stores, in the storage section 70, the "work information" linked with e.g. the "ancillary information" including the "time information", inputted location information.

Moreover, if the monitoring section 69 detects that the communication between the smartphone Y and the server Z is not possible, then, the control section 71 links the "ancillary information" including "time information" (hour information) with the "work information" and acquires via the input section 64 the location information inputted from the input device 16 of the combine X or inputs location information from the touch panel 31 of the smartphone Y and links this with the "work information". Then, if the monitoring section 69 detect that the communication between the communication section 68 of the combine X and the smartphone Y is not possible, then, the control section 71 stores, in the storage section 70 of the combine X or in the terminal storage section 42 of the smartphone Y, the "work information" linked with e.g. the "ancillary information" including the "time information", inputted location information, or the "GPS location information".

Furthermore, if the monitoring section 69 detects that the communication between the combine X and the smartphone Y is now possible again after occurrence of communication interruption or breakdown in a communication path between the combine X, the smartphone Y and the server Z, the control section 71 transmits the "work information" stored in the storage section 70 of the combine X or in the terminal storage section 42 of the smartphone Y to the server Z via the smartphone Y.

[Explanation of Operations]

Next, operations of the above-described configurations will be explained.

Figure 5:
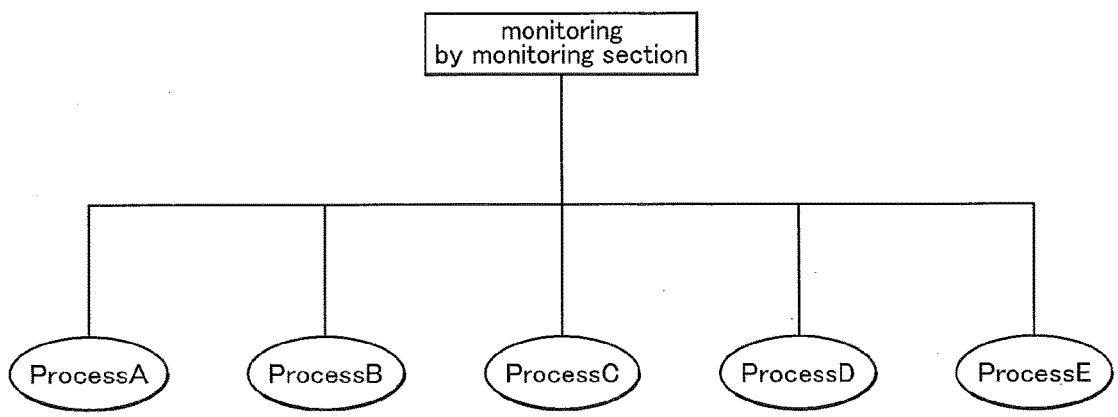
FIG. 5 is an explanatory view showing a pattern of processing at the time of communication monitoring.

The monitoring section 69, as shown in FIG. 5, executes a communication monitoring method for constantly monitoring the communication condition between the combine X and the smartphone Y, the communication condition between the smartphone Y and the server Z and reception condition of "GPS location information" by the smartphone Y ("monitoring step"). Depending on a situation detected by the monitoring section 69, Process A, Process B, Process C, Process D are selectively effected. In particular, in case communication becomes impossible between the combine X and the smartphone Y, or in case communication becomes impossible between the smartphone Y and the server Z, or in case reception of "GPS location information" becomes impossible, the "time information" included in the "ancillary information" will be linked with the "work information".

Figure 6:
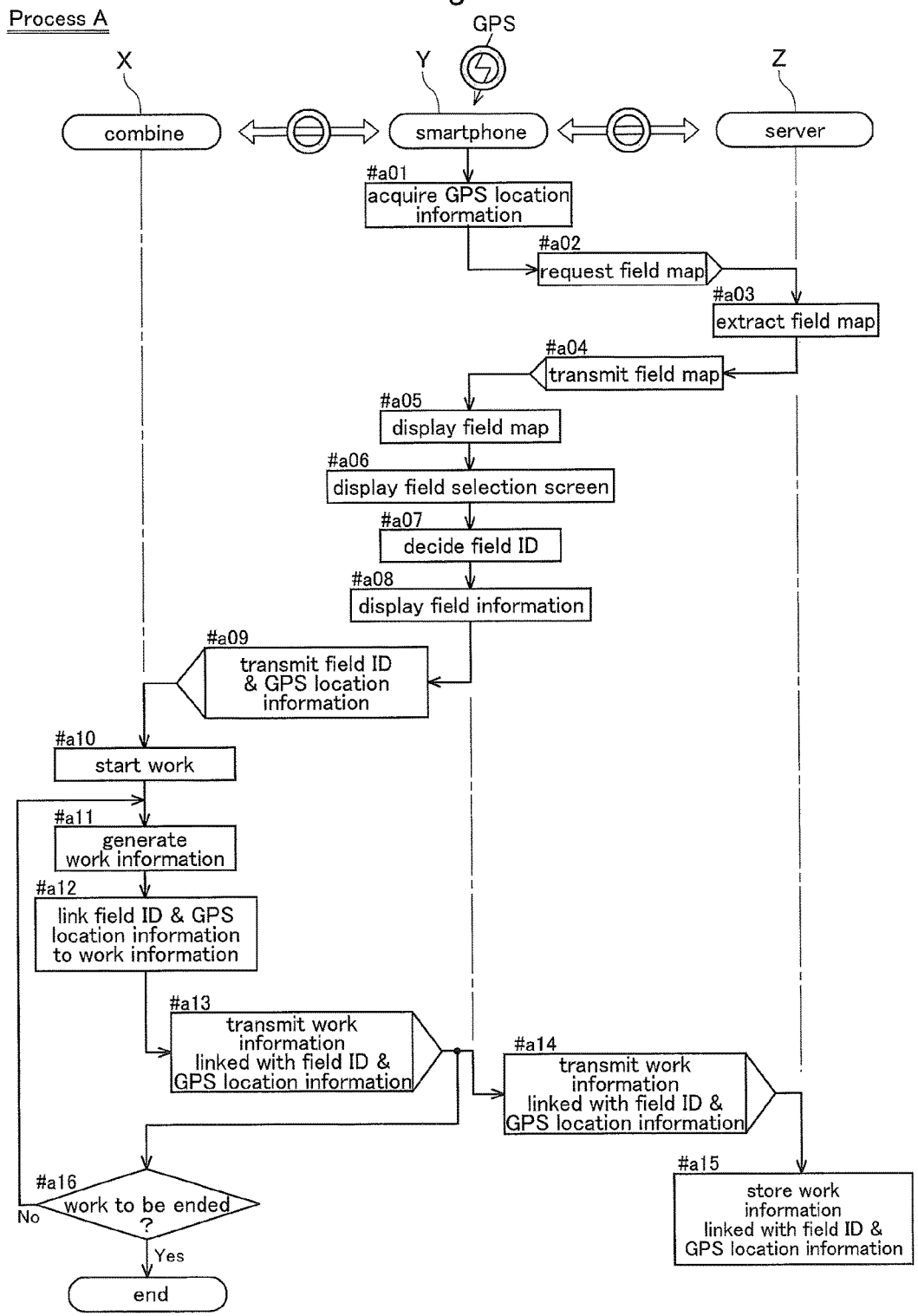
FIG. 6 is a chart diagram showing data flow at the time of the processing in FIG. 5.
Figure 11:
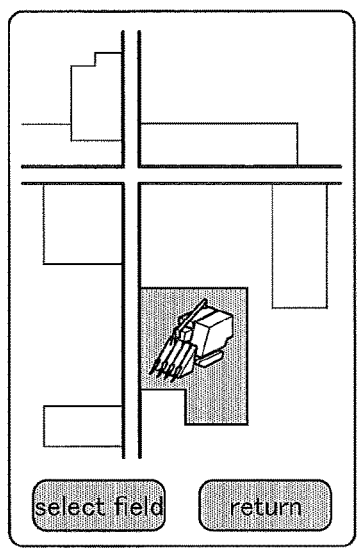
FIG. 11 is an explanatory view showing an example of display of a field selection screen.

As shown in FIG. 6, Process A is effected when communication between the combine X and the smartphone Y is possible AND communication between the smartphone Y and the server Z is possible AND "GPS location information" is receivable. In this process, firstly, the "GPS location information" is acquired by the GPS acquiring section 39 of the smartphone Y (#a01). Then, the terminal control section 41 of the smartphone Y issues request for "field map" to the server Z via the long-range communication network (#a02). Upon receipt of this request for "field map" from the smartphone Y, the field management section 53 effects extraction of the "field map" from the field map database 55 (#a03). In this, the field management section 53 links the "field map" acquired from the field map database 55 with field information relating to the field stored in the field information database 56, and the server Z transmits the "field map" to the smartphone Y (#a04). Upon receipt of this "field map" from the server Z, the smartphone Y causes the terminal output section 38 to display the "field map" on the terminal display 32 (#a05). Then, the terminal output section 38 displays the "field selection screen" as shown in FIG. 11 on the terminal display 32 (#a06). Then, the driver will touch-operate the touch panel 31 to select a "field ID" of the field in which a work is now to be effected, from among "field IDs" displayed in the "field selection screen". With this, a "field ID" is decided (#a07). Upon the selection of the "field ID", the terminal display 32 displays "field information" corresponding to this "field ID" (#a08). Then, from the smartphone Y to the combine X, the "field ID" is transmitted and then the "GPS location information" is transmitted (#a09). When the work by the combine X is started (#a10), then, "work information" is generated based on the work effected (#a11). And, the "work information" is linked to the "field ID" and the "GPS location information" by the control section 71 of the combine X (#a12). And, from the combine X to the smartphone Y, the "work information" linked with the "field ID" and the "GPS location information" is transmitted (#a13). Upon receipt of the "work information" linked with the "field ID" and the "GPS location information" from the combine X, the smartphone Y transmits (forwards) data thereof to the server Z ("transmitting-receiving step") (#a14). The server Z revises and stores in the field information database 56 the "work information" linked with the "field ID" and the "GPS location information" as "field information" (#a15). Further, after the step #a13, the combine X checks whether the work is to be ended or not (#a16) and if the work is not to be ended, the process returns to the step #a11 (NO at #a16). If the work is to be ended, generation of "work information" and data transmission are ended (YES at #a16). In this way, in Process A, until completion of a work, "work information" linked with "field ID" and "GPS location information" is transmitted from the combine X to the server Z via the smartphone Y and data is stored in the server Z.

Figure 7:
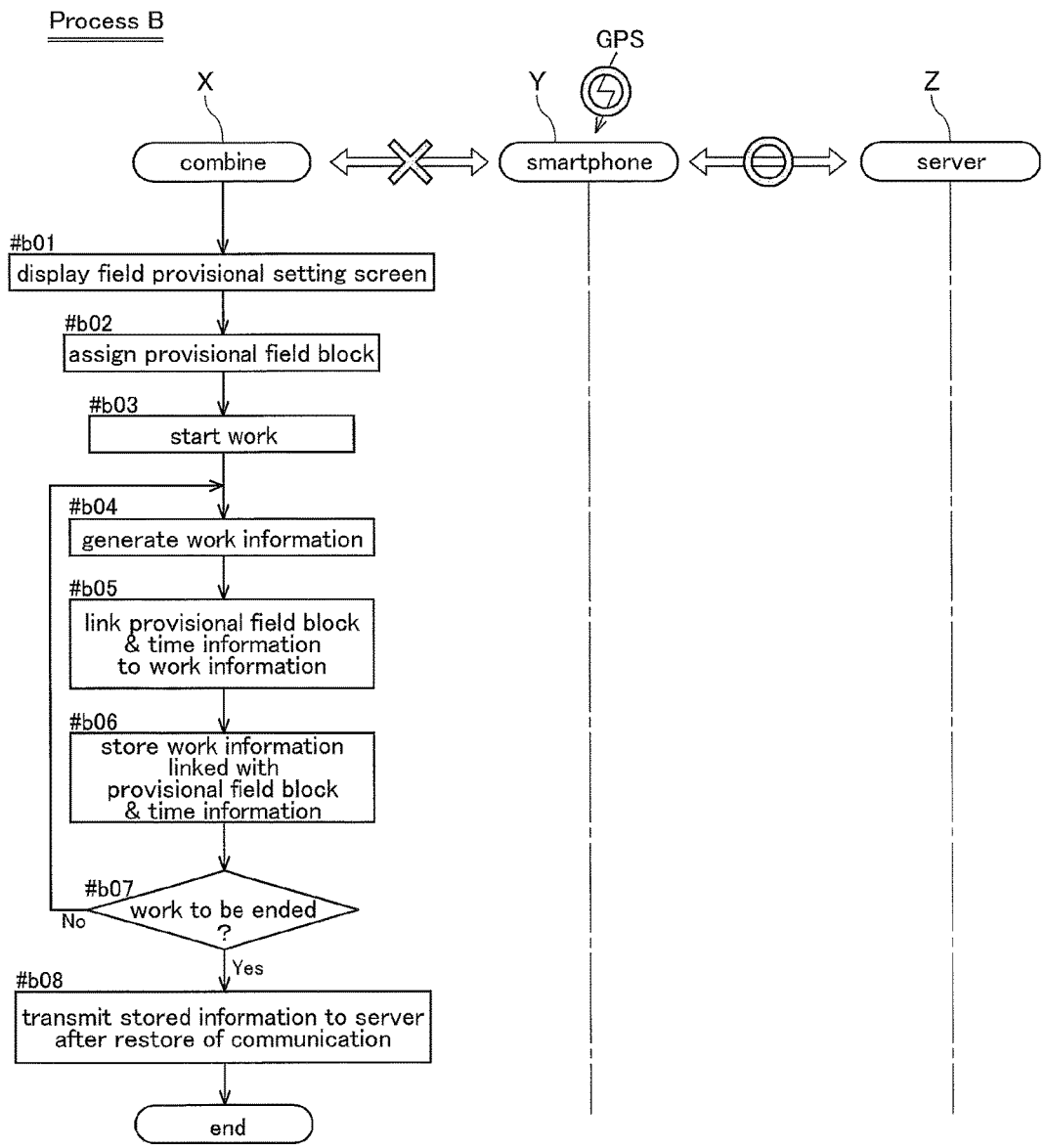
FIG. 7 is a chart diagram showing data flow at the time of the processing in FIG. 5.

As shown in FIG. 7, Process B is effected in case communication between the combine X and the smartphone Y is not possible, regardless of communication condition between the smartphone Y and the server Z or the acquisition condition of the "GPS location information" (FIG. 7 shows, as an example, a situation when communication is possible between the smartphone Y and the server Z AND acquisition of "GPS location information" is possible). Firstly, a "field provisional setting screen" is displayed on the vehicle-mounted display 18 of the combine X (#b01) and assignment of a "provisional field block" is effected (#b02). When a work by the combine X is started (#b03), "work information" is generated based on the work effected (#b04). Then, the control section 71 of the combine X links "work information" with the "provisional field block" and the "time information" (#b05). And, the "work information" linked with the "provisional field block" and the "time information" is stored in the storage section 70 of the combine X (#b06). Then, the combine X checks whether the work is to be ended or not (#b07) and if the work is to be continued, the process returns to the step #b04 (NO at #b07). Otherwise, the work is ended (YES at #b07). Thereafter, when the communication possibility between the combine X, the smartphone Y and the server Z is restored, the "work information" linked with the "provisional field block" and the "time information" and stored in the storage section 70 is transmitted ("follow-up transmitting step") (#b08). Incidentally, the data such as the "work information" stored in the storage section 70 will be erased after confirmation of data reception report from the server Z. Further, upon receipt of the "work information" linked with the "provisional field block" and the "time information", the server Z stores this data at the provisional storage database 57.

Incidentally, the "work information" linked with the "provisional field block" and stored in the provisional storage database 57 will be linked with proper "field ID" with referencing the "provisional field block" with the "field ID". The "work information" linked with the proper "field ID" will be stored in the field information database 56 as a part of new "field information relating to the "field ID".

Figure 12:
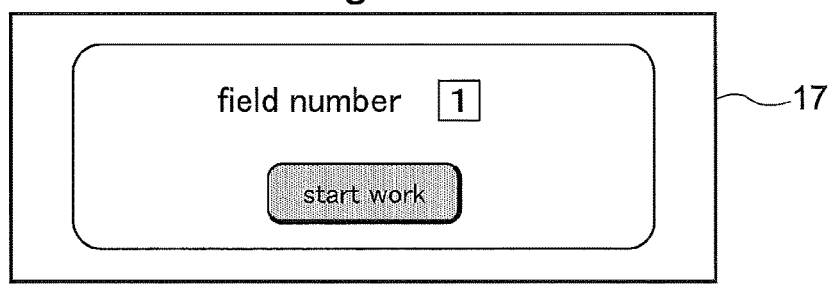
FIG. 12 is an explanatory view showing an example of display of a field provisional setting screen.
Figure 13:
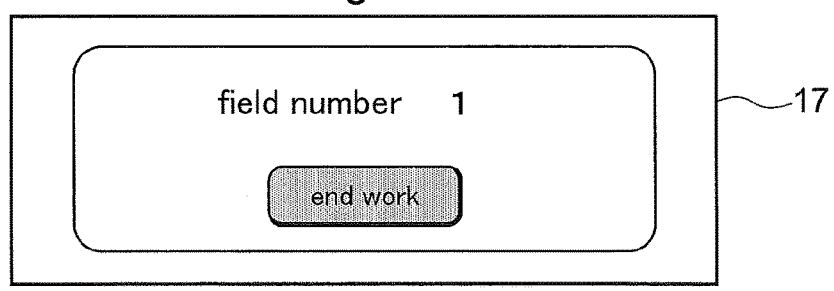
FIG. 13 is an explanatory view showing an example of display of a field provisional setting screen.
Figure 14:
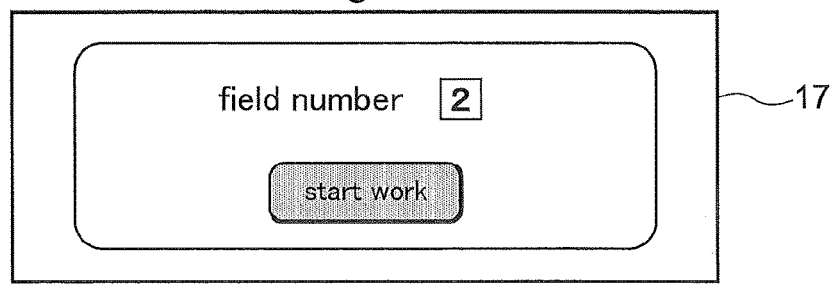
FIG. 14 is an explanatory view showing an example of display of a field provisional setting screen.

Here, the "field provisional setting screen", as shown in FIGS. 12-14, is displayed for showing the driver the "work information" in the form of "provisional field blocks", that is, dividing the field into separate units of field units. The "provisional field block" is displayed in the form of numerals, characters or the like according to a work sequence. For instance, in case the "field block" is shown by a field number representing the work sequence, a first field will be assigned with "field block" having field number "1" (see FIG. 12), and then the work will be started. Upon completion of the work (see FIG. 13), the field block will be automatically switched to "field block" having field number "2" (see FIG. 14). Namely, the portion from start of work to completion of work is considered as one field unit and for each field unit, "work information" will be stored. Incidentally, the separation into blocks can be effected in response to, i.e. being triggered by, occurrence of blank period in the course of movement from a first field to a second field or engagement/disengagement of the discharge clutch 23.

Figure 8:
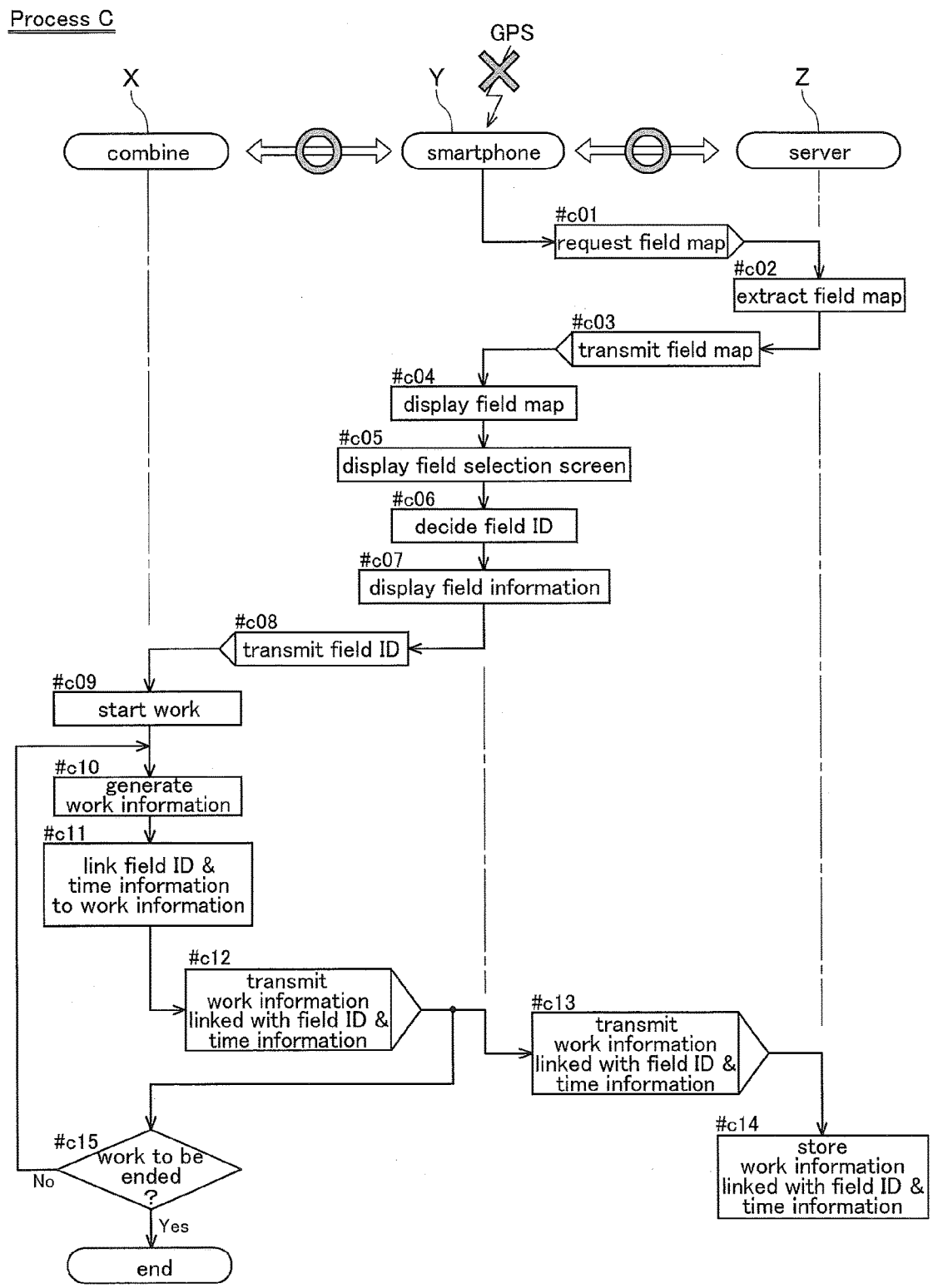
FIG. 8 is a chart diagram showing data flow at the time of the processing in FIG. 5.
Figure 10:
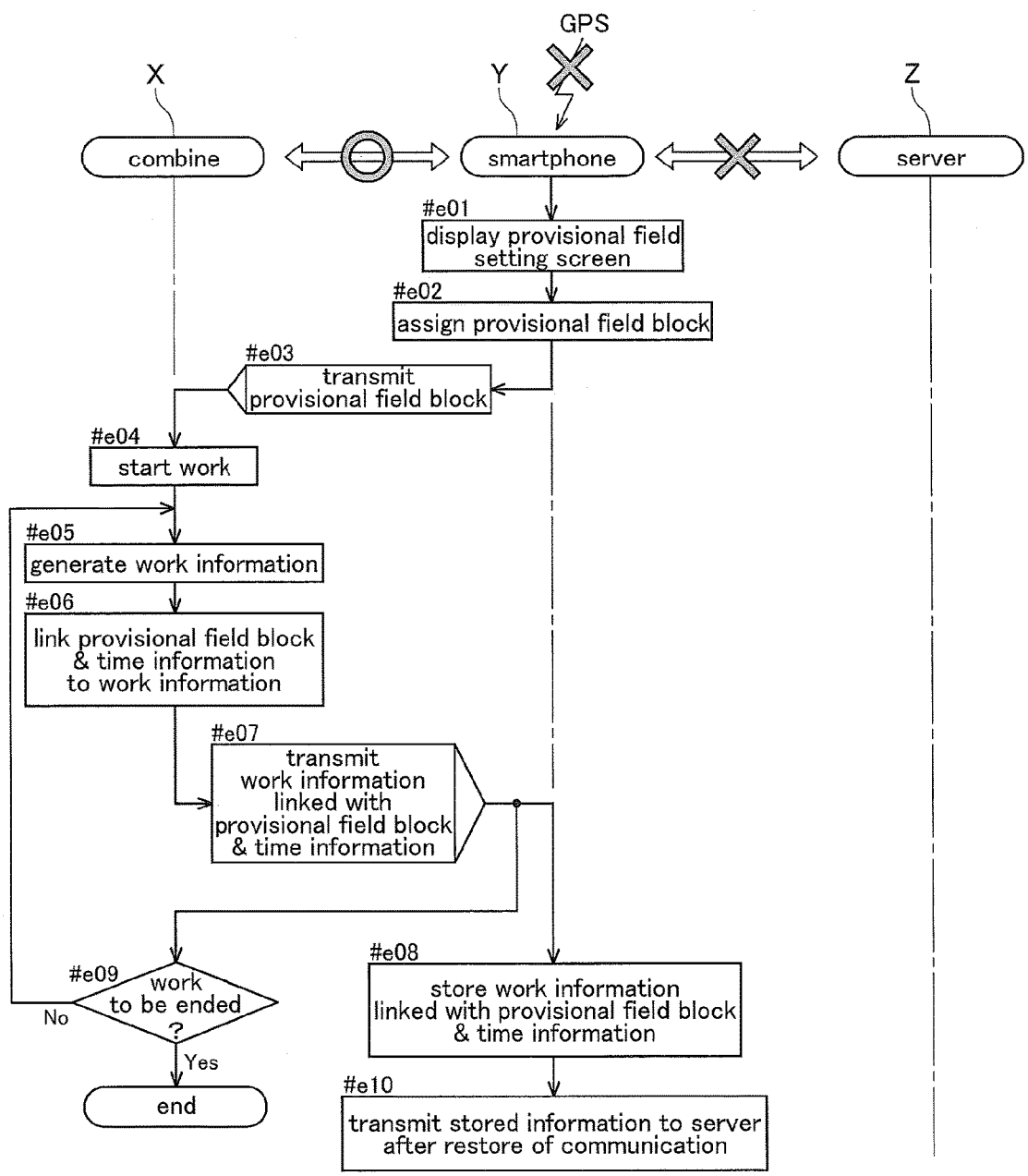
FIG. 10 is a chart diagram showing data flow at the time of the processing in FIG. 5.

As shown in FIG. 8, Process C is effected in case communication between the combine X and the smartphone Y is possible, AND communication between the smartphone Y and the server Z is possible AND reception of "GPS location information" is not possible. Firstly, the terminal control section 41 of the smartphone Y issues a request for "field map" to the server Z via the long-range communication network (#c01). Upon receipt of this request for "field map" from the smartphone Y, in the server Z, the field management section 53 extract s "field map" from the field map database 55 (#c02). In this, the field management section 53 links the "field map" extracted from the field map database 55 with field information relating to the field stored in the field information database 56. Then, the server Z transmits the "field map" to the smartphone Y (#c03). In the smartphone Y, upon receipt of the "field map" from the server Z, the terminal output section 38 displays the "field map" on the terminal display 32 (#c04). And, the terminal output section 38 causes the terminal display 32 to display the "field selection screen" as shown in FIG. 10 (#c05). Among the "field ID" s displayed in the "field selection screen", the driver will touch the "field ID" of the field where the work is now to be carried out, whereby a "field ID" is decided (#c06). Upon selection of the "field ID", the terminal display 32 will display "field information" corresponding to the "field ID" (#c07). And, the "field ID2 will be transmitted from the smartphone Y to the combine X (#c08). When the work by the combine X is started (#c09), "work information" will be generated based on this work effected (#c10). And, the control section 71 of the combine X links the "work information" with "field ID" and "time information" (#c11). Then, the "work information" linked with "field ID" and "time information" is transmitted from the combine X to the smartphone Y (#c12). Upon receipt of this "work information" linked with "field ID" and "time information" from the combine X, the smartphone Y transmits (forwards) its data to the server Z (#c13). In the server Z, the "work information" linked with the "field ID" and "time information" will be stored in the field information database 56 as a part of new "field information" (#c14). Further, after the step #c12, the combine X checks whether to end the work or not (#c15). If the work is not to be ended, the process will return to step #c10 (NO at step #c15). If the work is to be ended, generation of "work information" and transmission of data will be ended (YES at step #c15). As described above, in this Process C, until completion of a work, "work information" linked with "field ID" and "time information" will be transmitted from the combine X to the server Z via the smartphone Y. In the server Z, the "work information" linked with the "field ID" and "time information" will be stored in the field information database 56 as a part of new "field information" relating to the "field ID".

Figure 9:
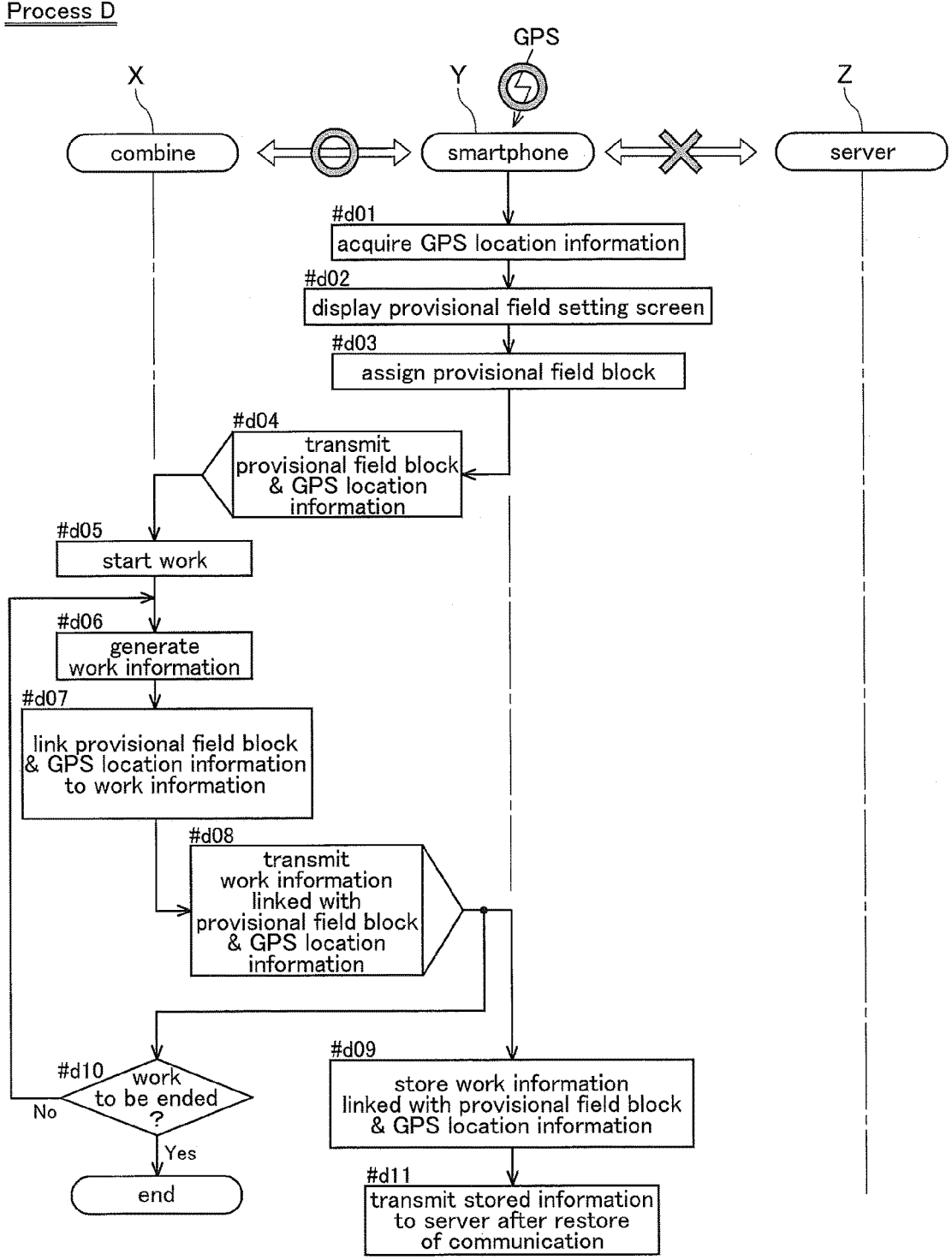
FIG. 9 is a chart diagram showing data flow at the time of the processing in FIG. 5.

As shown in FIG. 9, Process D is effected in case communication between the combine X and the smartphone Y is possible, AND communication between the smartphone Y and the server Z is not possible AND reception of "GPS location information" is possible. Firstly, "GPS location information" is acquired by the GPS acquiring section 39 of the smartphone Y (#d01). And, since "field map" cannot be obtained from the server Z, the terminal display 32 of the smartphone Y will display "field provisional setting screen" (#d02) and "provisional field block" will be assigned ("inputting step") (#d03). And, the "provisional field block" is transmitted from the smartphone Y to the combine X and "GPS location information" will be transmitted sequentially (#d04). Incidentally, since communication between the combine X and the smartphone Y is possible, the "field provisional setting screen" may be displayed on the vehicle-mounted display 18 and assignment of the "provisional field block" may be effected ("inputting step"). When the work by the combine X is started (#d05), "work information" will be generated based on this work effected (#d06). And, the control section 71 of the combine X links the "work information" with "provisional field block" and "GPS location information" ("location linking step") (#d07). Then, the "work information" linked with "provisional field block" and "GPS location information" is transmitted from the combine X to the smartphone Y (#d08). Upon receipt of this "work information" linked with "provisional field block" and "GPS location information" from the combine X, in the smartphone Y, its data is stored in the terminal storage section 42 of the smartphone Y ("storing step") (#d09). And, the combine X checks whether to end the work or not (#d10). If the work is to be continued, the process will return to step #d06 (NO at step #d10). Otherwise, the work will be ended (YES at step #d10). Then, when the communication between the combine X, the smartphone Y and the server Z is restored, the "work information" linked with the "provisional field block" and "GPS location information" stored in the terminal storage section 42 will be transmitted ("follow-up transmitting step") (#d11). Incidentally, the data such as the "work information" stored in the terminal storage section 42 of the smartphone Y will be erased after confirmation of data reception report from the server Z. Further, upon receipt of the "work information" linked with the "provisional field block" and the "GPS location information", the server Z stores this data at the provisional storage database 57.

Incidentally, the "work information" linked with the "provisional field block" and stored in the provisional storage database 57 will be linked with proper "field ID" with referencing the "provisional field block" with the "field ID". The "work information" linked with the proper "field ID" will be stored in the field information database 56 as a part of new "field information relating to the "field ID".

Also, in Process D, after the step #d07, instead of effecting the steps #d08, #d09, #d11, the "work information" linked with the "provisional field block" and the "GPS location information" may be stored in the storage section 70 of the combine X ("storing step"). Further alternatively, after the step #d07, in addition to effecting the steps #d08, #d09, #d11, the "work information" linked with the "provisional field block" and the "GPS location information" may be stored in the storage section 70 of the combine X. That is, the "work information" linked with the "provisional field block" and the "GPS location information" can be stored in either the storage section 70 of the combine X or the terminal storage section 42 of the smartphone Y.

As shown in FIG. 10, Process E is effected in case communication between the combine X and the smartphone Y is possible, AND communication between the smartphone Y and the server Z is not possible AND reception of "GPS location information" is not possible. Firstly, since "field map" cannot be received from the server Z, the terminal display 32 of the smartphone Y will display "field provisional setting screen" (#e01) and "provisional field block" will be assigned ("inputting step", "location linking step") (#e02). And, the "provisional field block" is transmitted from the smartphone Y to the combine X (#e03). Incidentally, since communication between the combine X and the smartphone Y is possible, the "field provisional setting screen" may be displayed on the vehicle-mounted display 18 and assignment of the "provisional field block" may be effected ("inputting step", "location linking step"). When the work by the combine X is started (#e04), "work information" will be generated based on this work effected (#e05). And, the control section 71 of the combine X links the "work information" with "provisional field block" and "time information" ("time linking step") (#e06). Then, the "work information" linked with "provisional field block" and "time information" is transmitted from the combine X to the smartphone Y (#e07). Upon receipt of this "work information" linked with "provisional field block" and "time information" from the combine X, in the smartphone Y, its data is stored in the terminal storage section 42 of the smartphone Y ("storing step") (#e08). And, the combine X checks whether to end the work or not (#e09). If the work is to be continued, the process will return to step #e05 (NO at step #e09). Otherwise, the work will be ended (YES at step #e09). Then, when the communication between the combine X, the smartphone Y and the server Z is restored, the "work information" linked with the "provisional field block" and "time information" stored in the terminal storage section 42 of the smartphone Y will be transmitted ("follow-up transmitting step") (#e10). Incidentally, the data such as the "work information" stored in the terminal storage section 42 of the smartphone Y will be erased after confirmation of data reception report from the server Z. Further, upon receipt of the "work information" linked with the "provisional field block" and the "time information", the server Z stores this data at the provisional storage database 57.

Incidentally, the "work information" linked with the "provisional field block" and stored in the provisional storage database 57 will be linked with proper "field ID" with referencing the "provisional field block" with the "field ID". The "work information" linked with the proper "field ID" will be stored in the field information database 56 as a part of new "field information relating to the "field ID".

Also, in Process E, after the step #e06, instead of effecting the steps #e07, #e08, #e10, the "work information" linked with the "provisional field block" and the "time information" may be stored in the storage section 70 of the combine X ("storing step"). Further alternatively, after the step #e06, in addition to effecting the steps #e07, #e08, #e10, the "work information" linked with the "provisional field block" and the "time information" may be stored in the storage section 70 of the combine X. That is, the "work information" linked with the "provisional field block" and the "time information" can be stored in either the storage section 70 of the combine X or the terminal storage section 42 of the smartphone Y.

The contents described above can be summarized as shown in FIG. 15.

[1] In case communication between the combine X and the smartphone Y is possible AND communication between the smartphone Y and the server is possible AND "GPS location information" can be acquired, Process A is effected and "field ID", "GPS location information" and "work information" will be stored in the server Z.

[2] In case communication between the combine X and the smartphone Y is not possible regardless of communication condition between the smartphone Y and the server Z or the acquisition condition of "GPS location information", Process B is effected and "provisional field block", "time information" and "work information" will be provisionally stored in the combine X.

[3] In case communication between the combine X and the smartphone Y is possible AND communication between the smartphone Y and the server Z is possible AND "GPS location information" cannot be acquired, Process C is effected and "field ID", "time information" and "work information" will be stored in the server Z.

[4] In case communication between the combine X and the smartphone Y is not possible AND communication between the smartphone Y and the server Z is not possible AND "GPS location information" cannot be received, Process D is effected and "provisional field block", "GPS location information" and "work information" will be stored in the storage section 7 of the combine X or the terminal storage section 42 of the smartphone Y.

[5] In case communication between the combine X and the smartphone Y is possible AND communication between the smartphone Y and the server Z is not possible AND "GPS location information" cannot be received, Process E is effected and "provisional field block", "time information" and "work information" will be stored in the storage section 7 of the combine X or the terminal storage section 42 of the smartphone Y.

Incidentally, when the monitoring section 69 detects that communication between the smartphone Y and the server Z has been disabled, alarming to the driver will be effected ("alarming step").

Second Embodiment

Next, a second embodiment of the present invention will be explained. In the above-described first embodiment of the present invention, the combine X effects the communication monitoring method for monitoring communication. In the second embodiment of the present invention, the smartphone Y effects a communication monitoring method for monitoring communication between the smartphone Y and the server Z. This communication monitoring is effected based on an application program installed in the smartphone Y which is a computer. Incidentally, the respective configurations of the second embodiment of the present invention are identical to those of the first embodiment, except some contents of the second embodiment to explained next.

Figure 17:
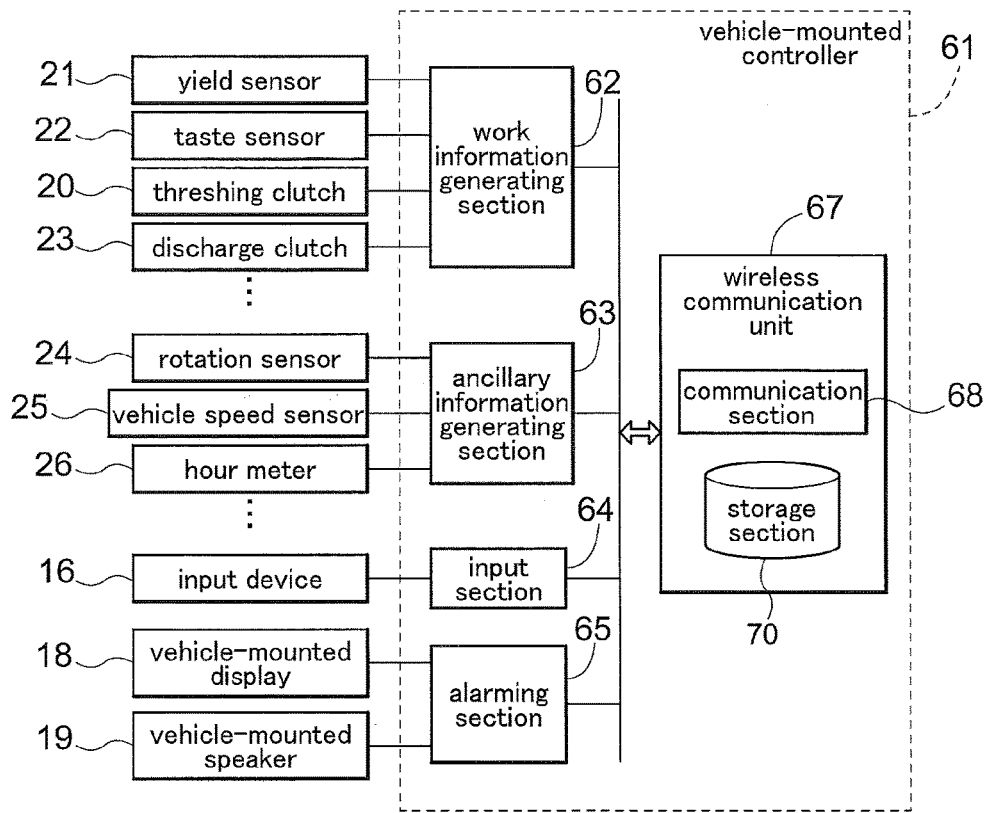
FIG. 17 is an explanatory view showing a system configuration in the second embodiment of the present invention.
Figure 18:
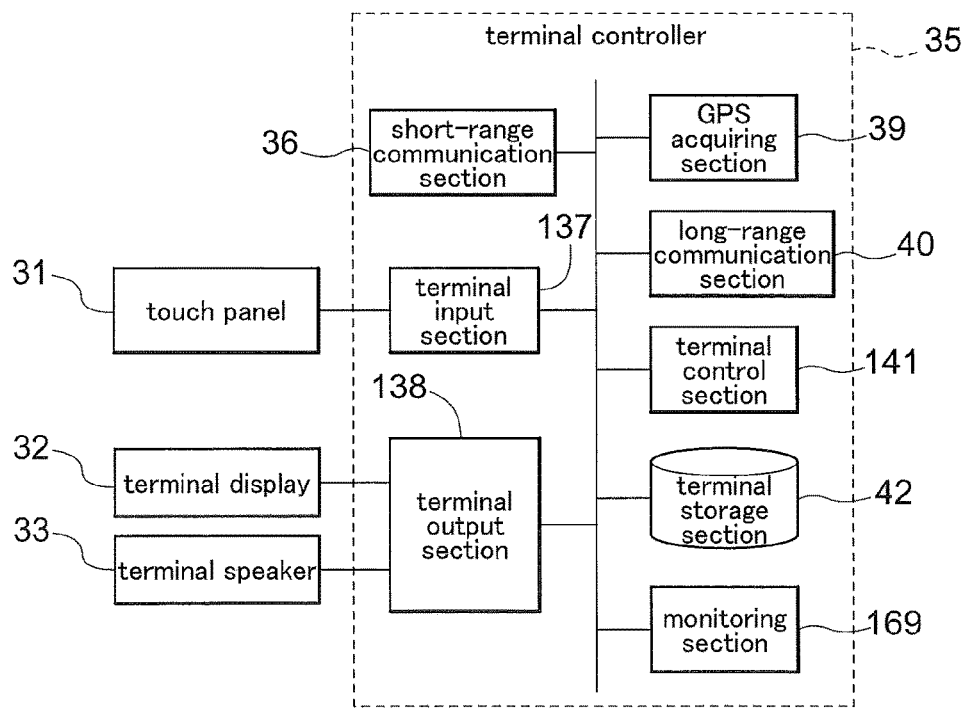
FIG. 18 is an explanatory view showing a system configuration in the second embodiment of the present invention.

In the second embodiment of the present invention, as shown in FIGS. 16 through 18, unlike the first embodiment in which the monitoring section 69 and the control section 71 are provided in the combine X, a monitoring section 169 is provided in the smartphone Y. Further, a terminal input section 137, a terminal output section 138 and a terminal control section 141 having different functions from those of the first embodiment are provided. The monitoring section 169 is configured to realize a monitoring function of monitoring communication condition between the smartphone Y and the server Z and detecting whether communication between the smartphone Y and the server Z is possible or not. The terminal control section 141 has a similar function to the control section 71 provided in the first embodiment. The various functions of the monitoring section 169 and the terminal control section 141 are realized by the application program.

The monitoring section 169 constantly effects checking of communication condition between the smartphone Y and the server Z ("monitoring step"). The monitoring section 169 constantly checks connection to the server Z and if a response from the server Z is present, the monitoring section 169 detects that communication between the smartphone Y and the server Z is possible. Whereas, in the case of absence of response from the server Z, the monitoring section 169 detects that communication between the smartphone Y and the server Z is not possible.

If the monitoring section 169 detects that communication between the smartphone Y and the server Z is possible, the terminal control section 141 requests "field map" from the server Z and receives the "field map" from the server Z. The terminal control section 141 receives from the communication section 68 of the combine X "work information" such as "yield data", "taste data" or the like of work effected by the work section such as the reaping section 13 or the threshing device 14 of the combine X and transmits this to the server Z ("transmitting-receiving step").

Further, the terminal control section 141 links "time information" of the time point of detection of communication impossibility by the monitoring section 169 with the "work information" ("time linking step").

Further, if the monitoring section 169 detects that communication between the smartphone Y and the server Z is not possible, the terminal control section 141 links the "work information" transmitted from the combine X with "GPS location information" acquired by the GPS acquiring section 39 ("GPS linking step").

Also, if the monitoring section 169 detects that communication between the smartphone Y and the server Z is not possible, the terminal control section 141 causes the terminal storage section 42 of the smartphone Y or the storage section 70 of the combine X to store the "work information" ("storing step"). In case "GPS location information" can be acquired by the GPS acquiring section 39, the "work information" linked with this "GPS location information" will be stored in the terminal storage section 42 of the smartphone Y or the storage section 70 of the combine X.

Further, if the monitoring section 169 detects that the communication between the smartphone Y and the server Z is not possible, the terminal output section 138 will effect alarming to the driver ("alarming step"). In this, as examples of method of alarming, there are displaying alarming by the terminal display 32 of the smartphone Y, sound alarming by the terminal speaker 33 of the smartphone Y and vibration alarming by the unillustrated vibrator of the smartphone Y, displaying alarming by the vehicle-mounted display 18, sound alarming by the vehicle-mounted speaker 19.

Moreover, the terminal input section 137 is configured to be capable of inputting location information to enable estimation of the location of the field of the location where a ground-work was effected ("inputting step"). For instance, a "provisional field setting screen" will be displayed on the terminal display 32 of the smartphone Y or the vehicle-mounted display 18 of the combine X. Further, the terminal input section 37 links information of location inputted via the touch panel 31 of the smartphone Y or the input device 16 of the combine X in e.g. the "provisional field setting screen" with the "work information" ("location linking step").

If the monitoring section 169 detects that communication is not possible between the smartphone Y and the server Z and then detects this communication between the smartphone Y and the server Z is now restored, the terminal control section 141 transmits the "work information" or the like stored in the terminal storage section 42 of the smartphone Y or the storage section 70 of the combine X to the sever Z via the smartphone Y ("follow-up transmitting step").

In the second embodiment, the monitoring section 169 of the smartphone Y constantly monitors communication condition between the smartphone Y and the server Z and acquisition condition of "GPS location information". And, depending on a situation detected by the monitoring section 169, portions of processes constituting Process A, Process C, Process D and Process E in the first embodiment will be effected selectively. Also, in this second embodiment, linking operations of "work information" to the "GPS location information" and "time information" are effected on the side of the smartphone Y. Furthermore, in this second embodiment, like the first embodiment, in case "GPS location information" cannot be acquired, "time information" as "ancillary information" is linked to the "work information" ("time linking step").

Other Embodiments (1) In the first embodiment and the second embodiment described above, there was disclosed an example in which "time information" as "ancillary information" is linked to "work information". However, the invention is not limited thereto. For instance, as "ancillary information", a travel distance, an engine operation time, a fuel consumption amount, a vehicle speed, etc. can be linked to "work information".

(2) In the first embodiment and the second embodiment described above, there was disclosed an example in which "field map" linked with field information is transmitted from the server Z to the smartphone Y. However, the invention is not limited thereto. The field information" may not be contained in the "field map" transmitted from the server Z to the smartphone Y.

(3) In the first embodiment and the second embodiment described above, there was disclosed an example in which "GPS location information" is acquired by the smartphone Y. However, the invention is not limited thereto. For instance, if the combine X includes a device for acquiring "GPS location information" as a car navigation system, "GPS location information" can be acquired on the combine X side.

(4) In the first embodiment and the second embodiment described above, there was disclosed an example in which the communication section 68 and the storage section 70 of the combine X are incorporated within the wireless communication unit 67. However, the invention is not limited thereto. The communication section 68 and the storage section 70 can be provided separately as long as they are connected to a data transmission line.

(5) In the first embodiment and the second embodiment described above, as an example of the mobile communication terminal, the smartphone Y was shown. However, the invention is not limited thereto. For instance, any other mobile terminal device such as a tablet type personal computer, a laptop type computer, a navigator device, a feature phone, etc. can also be used.

INDUSTRIAL APPLICABILITY OF THE INVENTION

In addition to the crawler traveling self-threshing type combine X described above, the present invention is applicable to other work machines such as a wheel traveling type or whole-culm type combine, a tractor, a rice planter, a fertilizer, a chemical spraying machine, a grass mower, a civil engineering work device, etc.

DESCRIPTION OF REFERENCE MARKS/NUMERALS

13: reaping section ("work section")
14: threshing device ("work section")
42: terminal storage section
64: input section
65: alarming section
68: communication section
69: monitoring section
70: storage section
71: control section
X: combine
Y: smartphone
Z: server

The invention claimed is:

1. A work machine comprising:
a work section for effecting a ground work;
a communication section capable of communication with an external server via a mobile communication terminal, the mobile communication terminal comprising a GPS acquiring section and a terminal display; and
a control section operatively connected to the communication section and configured to:
receive GPS location information and field identification information of a field in which a work is to be effected from the mobile communication terminal, wherein the GPS location information is acquired by the GPS acquiring section of the mobile communication terminal and the field identification information is generated by the mobile communication terminal requesting a field map from the external server, displaying the field map on the terminal display of the mobile communication terminal, and selecting the field identification information of the field upon which the ground work is to be effected;
generate work information based on the ground work effected by the work section;
associate the work information with the GPS location information and the field identification information; and
transmit the work information, associated with the GPS location information and the field identification information, to the external server via the communication section and the mobile communication terminal.

2. The work machine of claim 1, further comprising:
a monitoring section for monitoring communication condition between the communication section and the mobile communication terminal; and
a storage section capable of storing information of the ground work effected by the work section.

3. The work machine of claim 2, wherein the work information, associated with the GPS location information and the field identification information, is transmitted to the external server when the monitoring section detects that communication is possible between the mobile communication terminal and the external server.

4. The work machine of claim 3, wherein the storage section or a terminal storage section of the mobile communication terminal stores the work information, associated with the GPS location information and the field identification information, when the monitoring section detects that no communication is possible between the mobile communication terminal and the external server.

5. The work machine of claim 2, wherein the work information, associated with the GPS location information and the field identification information, is transmitted to the external server when the monitoring section detects that communication is possible between the communication section and the mobile communication terminal.

6. The work machine of claim 5, wherein the storage section stores the work information, associated with the GPS location information and the field identification information, when the monitoring section detects that no communication is possible between the communication section and the mobile communication terminal.

7. The work machine of claim 2, further comprising:
an alarming section to effect alarming to a driver when the monitoring section detects that the communication is not possible.

8. The work machine of claim 2, wherein the control section links time information at time point of detection of communication impossibility by the monitoring section with the work information.

9. The work machine of claim 1, wherein the communication section is configured to communicate with the mobile communication terminal via a short-range wireless communication protocol and the mobile communication terminal is configured to communicate with the external server via a long-range wireless communication protocol.

10. A communication method for communication information between a work machine that effects a ground work, an external server and a mobile communication terminal, the method comprising:
acquiring GPS location information by a GPS acquiring section of the mobile communication terminal;
generating field identification information by the mobile communication terminal requesting a field map from the external server, displaying the field map on a terminal display of the mobile communication terminal, and selecting the field identification information of the field upon which the ground work is to be effected;
transmitting the GPS location information and the field identification information from the mobile communication terminal to a communication section of the work machine;
generating work information by a control section of the work machine based on the ground work effected by a work section of the work machine;
associating the work information with the GPS location information and the field identification information by the control section of the work machine; and
transmitting the work information, associated with the GPS location information and the field identification information, to the external server via the communication section and the mobile communication terminal.

* * * * *